United States Patent [19]
Reinke

[11] Patent Number: 5,901,663
[45] Date of Patent: May 11, 1999

[54] APPARATUS FOR DRAWING WATER FROM THE TOP AND BOTTOM OF AN AQUARIUM FOR DELIVERY TO A FILTER

[76] Inventor: Mark A. Reinke, 4211 S. Natches Ct., Unit C-J, Englewood, Colo. 80110

[21] Appl. No.: 08/915,127

[22] Filed: Aug. 20, 1997

Related U.S. Application Data

[60] Provisional application No. 60/024,321, Aug. 22, 1996.
[51] Int. Cl.$^6$ .................................................. A01K 63/04
[52] U.S. Cl. ........................................................... 119/259
[58] Field of Search .................................. 119/245, 247, 119/248, 251, 259, 269

[56] References Cited

U.S. PATENT DOCUMENTS

| | | | |
|---|---|---|---|
| 3,119,774 | 1/1964 | Arak | 210/169 |
| 3,929,101 | 12/1975 | Katz | 119/5 |
| 4,257,352 | 3/1981 | Habegger | 119/259 |
| 5,054,424 | 10/1991 | Sy | 119/5 |
| 5,306,421 | 4/1994 | Weinstein | 119/248 |
| 5,469,810 | 11/1995 | Chiang | 119/248 |
| 5,518,611 | 5/1996 | Bresolin | 119/259 |

*Primary Examiner*—Thomas Price
*Attorney, Agent, or Firm*—Dorr, Carson, Sloan & Birney, P.C.

[57] ABSTRACT

A system is disclosed for drawing water from the top and bottom of an aquarium simultaneously for delivery to a filter. This system includes at least one subsurface tube connected to the lower portion of the back wall of the aquarium and brought to an external tank mounted to the back of the aquarium proximate to the surface water line. A horizontal rectangular opening at the surface water line of the aquarium allows the surface water from the aquarium to flow directly into the external tank. At least one drain tube leads from the external tank to an external algal or bacterial filtration system or simply to an overflow reservoir. Adjusting the height of the distal end of the subsurface tube within the external tank increases or decreases the hydraulic pressure in the subsurface tube, thus changing the proportional amount of water in the external tank being drawn from the bottom of the aquarium relative to that being drawn from the surface. Free of moving parts, the system will not harm tiny specimens. Should power fail to the return pump, the water level in the aquarium will drop to a height below the horizontal opening and at which point hydraulic pressure no longer causes water to flow from the subsurface tube into the external tank, thus preventing the entire aquarium from being drained. Drained water is collected in an external reservoir connected to the filter. With power restored the system will self-prime without operator assistance.

21 Claims, 8 Drawing Sheets

APPARATUS FOR DRAWING WATER FROM THE TOP AND BOTTOM OF AN AQUARIUM FOR DELIVERY TO A FILTER

RELATED APPLICATION

The present application is based on the Applicant's U.S. Provisional Patent Application 60/024,321, entitled "Method and Apparatus For Drawing Water From The Top And Bottom Of An Aquarium For Delivery To An External Filter System," filed on Aug. 22, 1996.

BACKGROUND OF THE INVENTION

1. Field of the Invention

The present invention relates generally to the field of aquariums. More specifically, the present invention discloses an apparatus for simultaneously drawing water at adjustable flow rates from the top and bottom of an aquarium for delivery to a filter.

2. Statement of the Problem

Aquariums have long been popular for keeping and displaying fish, both fresh and salt water. However, the recreation of freshwater or saltwater environments in the self-contained systems of home aquariums has presented considerable difficulties. Initially a good water source must be obtained for the start of the aquarium. This task pales in comparison to the task of maintaining the water quality and dealing with waste materials excreted by the aquatic specimens, formed by the natural decomposition by bacteria of plant, animal tissues and food, or resulting from foreign contamination of the aquarium environment. This task is even more important with saltwater environments, which must maintain many delicate balances including pH and salinity.

Maintaining a clean water environment throughout the aquarium necessitates the use of filters. In filtering the water, there are two parts to the water column that must cleaned. Specifically these parts are the surface and the water column below the surface, also referred to as surface and subsurface. The exchange of gases between the aquarium water and the atmosphere is important to the health of the specimens living in the aquarium. As dust, pollen, waste from the specimens and other pollutants collect at the surface of the water, the osmotic process of gas exchange between the aquarium and atmosphere is hampered. Light transmission into the water, which is necessary for both photosynthesis and viewing, is also reduced as contaminants accumulate on the surface of the water. It is therefore desirable to employ a system that removes surface water and contaminating materials from the aquarium. Many wastes and pollutants do not float and therefore remain in the water column between the surface and the bottom of the aquarium. These wastes and contaminants are occasionally herein referred to as subsurface wastes and contaminants.

To achieve filtration of the water column and the surface, the traditional method practiced is to cycle the entire aquarium water environment. Better systems attempt to create a water flow pattern that circulates water typically either from top to bottom, or from bottom to top. If water is removed from the surface and returned to the bottom, sufficient flow must be maintained to raise the pollutants and wastes to the surface for removal. Such a flow rate may be harmful to some forms of aquatic life.

If the water is to be removed from the bottom and returned to the surface, the surface tension must be disrupted in some manner so as to free the surface pollutants and wastes and allow them to be pulled by the flowing current to the bottom for removal. As surface contaminants may be quite foreign to the aquarium, pulling the contaminants through the water column exposes the specimens to them. Such exposure may cause significant harm and even death to the specimens.

The components involved in the present invention are in some respects similar to those used in systems developed in the past, including the following:

| Inventor | Pat. No. | Issue Date |
|---|---|---|
| Arak | 3,119,774 | Jan. 28, 1964 |
| Katz | 3,929,101 | Dec. 30, 1975 |
| Sy | 5,054,424 | Oct. 8, 1991 |

Arak discloses an undergravel filtration system in which the aquarium water is drawn through the gravel located at the bottom of the tank and then returned to the top, so as to create a bottom-to-top circulation.

Katz discloses an aquarium filtration system in which the water is drawn through an undergravel filter at the bottom of the tank, passed to a second filter outside the aquarium, and then returned to the top. This process creates a bottom-to-top circulation.

Sy discloses an aquarium filtration system that draws from the bottom of the aquarium tank, passes the water to a separate filtration tank, and then returns the filtered water to top of the aquarium near the high water mark so as to maintain bottom-to-top circulation.

To achieve filtration of both the water column and the surface without undue stress to the specimens in the aquarium, it is currently necessary to maintain two independent filtration systems, one of which filters the surface, and a second to filter the bottom/subsurface. The use of two systems is often quite cumbersome and expensive as both systems may require space outside of the aquarium, as well as separate pumps, power, water housings, and maintenance.

3. Solution to the Problem

None of the prior art references uncovered in the search show a system for drawing water from both the top and bottom of the aquarium simultaneously. The present invention overcomes the shortcomings associated with the prior art systems, that only remove water from only one location within the aquarium (i.e., either the surface or subsurface). By the use of subsurface tubes, water from the bottom of the aquarium is brought to an external tank where it is combined with water from the surface. By combining these two different water sources into one, it is possible to remove water simultaneously from the surface and bottom of the aquarium. Further it is possible to adjust the relative flow rate of water taken from either location and thus expand the applications for which the tank may be used.

SUMMARY OF THE INVENTION

This invention provides an apparatus that simultaneously draws water from the top and bottom of an aquarium. At least one subsurface hose is connected to the bottom of the aquarium and brought to an external tank mounted to the back of the aquarium proximate to the surface waterline. A horizontal rectangular opening is opened at the surface waterline of the aquarium, proximate to the external tank, and thus allows surface water from the aquarium to flow directly into the external tank. A removable plastic comb filter is positioned within the rectangular opening. This comb helps to protect small specimens in the aquarium from being drawn into the external tank. The subsurface tube bringing water from the bottom of the tank is mounted within the external tank in such a position that the distal end can be positioned below the surface waterline of the aquarium.

The external tank is connected to an algal filter, bacterial filter, or simply a reservoir by means of a drain tube connected to the bottom of the external tank. By adjusting the height of the distal end of the subsurface tube within the external tank, it is possible to increase or decrease the hydraulic pressure acting upon the subsurface tube. As the surface water and the subsurface bottom water mix in the external tank to form a common pool draining into the external filter or reservoir, varying the hydraulic pressure of the subsurface tube will increase or decrease the proportional amount of water from the bottom of the tank that is directed to the filter. This is desirable as some larval and young specimens of the aquarium develop at or near the surface. During their development it is necessary to reduce the skimming activity of the surface to avoid extraction of the young. Alternatively, for larger breeding operations, surface extraction could be used to help remove the young from the tank. In such a situation the drain tubes would empty directly into a second aquarium tank. This second tank would also employ the same water extraction system, except that it would be adjusted to extract only subsurface water. This procedure would allow automatic separation and isolation of the young. Another situation that could benefit from adjusting the system to draw more water from the surface would be if there were a sudden surface contamination.

As this system is free of moving parts it is not likely to cause injury to tiny specimens of the aquarium that are inadvertently drawn into the external tank. Lacking mechanical parts, it is also unlikely that performance of the system will degrade from wear and tear over time. In the event that power is disrupted the water of the aquarium will only be drained to the lower end of the horizontal opening near the top of the aquarium or the distal end of the subsurface tube in the external tank, whichever is lower. Water remaining in the external tank will be drained as well; however, this is minimal compared to the volume of the aquarium. It should be noted that water flows from the distal end of the subsurface tube from the bottom of the aquarium simply as a result of hydraulic pressure created by the surface water level in the aquarium being maintained at a higher elevation. As the aquarium is drained below the open distal end of the subsurface tube from the bottom, the hydraulic pressure will cease and water will no longer flow from the subsurface tube into the external tank and no additional water will be drained from the aquarium. When power is restored and water is returned to the aquarium from the filter, the subsurface tube within the external tank will self-prime as the water level in the aquarium rises above the distal end of the subsurface tube. This allows the system to recommence drawing surface and bottom water without operator assistance.

It should be noted that although the present invention is described herein with regard to aquariums, it is to be understood that the present invention may be practiced with commercial marine tanks found at commercial theme parks, public aquariums, and museums, as well as all other circumstances in which it is desirable to simultaneously extract surface and subsurface liquids from a common body.

A primary object of the present invention is to provide a method for simultaneously drawing water from the top and bottom of an aquarium, thus allowing more complete filtration for removal of surface and subsurface pollutants and contaminants.

Another object of the present invention is to provide a method for adjusting the relative flow rates of water being removed from the top or bottom of the aquarium.

A further object of the present invention is to provide an apparatus for drawing water from the top and bottom of an aquarium that is relatively quiet, compact, cost effective to manufacture, and does not create hazardous stresses on the aquarium or its inhabitants.

Another object of the present invention is to provide an apparatus for drawing water form the top and bottom of an aquarium which is durable and long lasting, capable of long-term operation without reduction in efficiency.

Yet another object of the present invention is to provide a method for removing water from the bottom of the aquarium to a separate filter system that will not drain the entire aquarium should the power for the return pump, or the return pump itself, fail.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
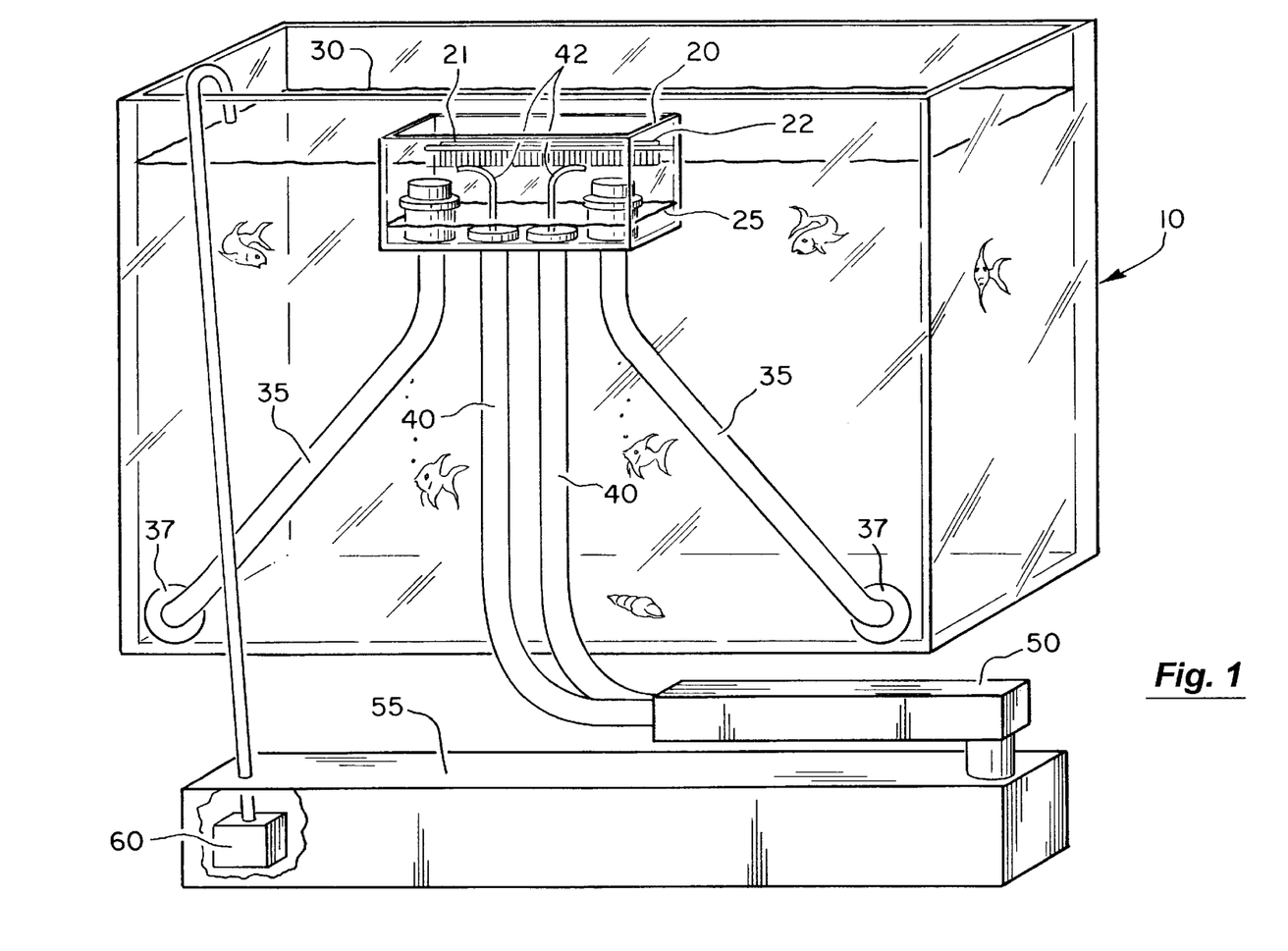
FIG. 1 is a rear perspective view of the entire assembly as it is attached to an aquarium, and showing an example of a filter, reservoir, and a water pump that would complete the system.

Turning to FIG. 1, a rear perspective view is provided of the entire assembly, including the aquarium 10, an external tank 20, a comb filter 22, subsurface tubes 35, drain tubes 40, drain venturi vents 42, an external filter 50, an overflow reservoir 55, and a return pump 60. The aquarium 10 can be any freshwater or saltwater aquarium containing fish, plants, and other aquatic specimens. The external tank 20 is mounted to the side of the aquarium 10 so that it is located proximate to the top of the aquarium 10 and surface water line. The surface water 30 of the aquarium 10 flows into the external tank 20 through a horizontal opening 21 with a comb filter 22. The volume or quantity of external tanks 20 will depend on the size of the aquarium 10, with the external tank 20 normally being only a fraction of the volume of the aquarium 10. With very large aquarium systems it may be desirable to have two smaller external tanks each positioned at the sides of the aquarium rather than one centrally located as depicted in FIG. 1. In such an arrangement each external tank could have one subsurface tube 35 and one drain tube 40 as opposed to the paired arrangement depicted in the drawings. Such an alternative would allow more efficient surface water removal from several locations and would minimize the length of subsurface tubes 35, but would not otherwise affect the functioning of the system.

It should be noted that the external tank 20 could also be mounted inside the aquarium if desired. Often when an aquarium is to be viewed from all sides, the components for water extraction and return are collectively gathered into a tower placed within the aquarium. In such a situation the external tank 20 could be mounted inside such a tower without affecting the present invention.

Figure 2:
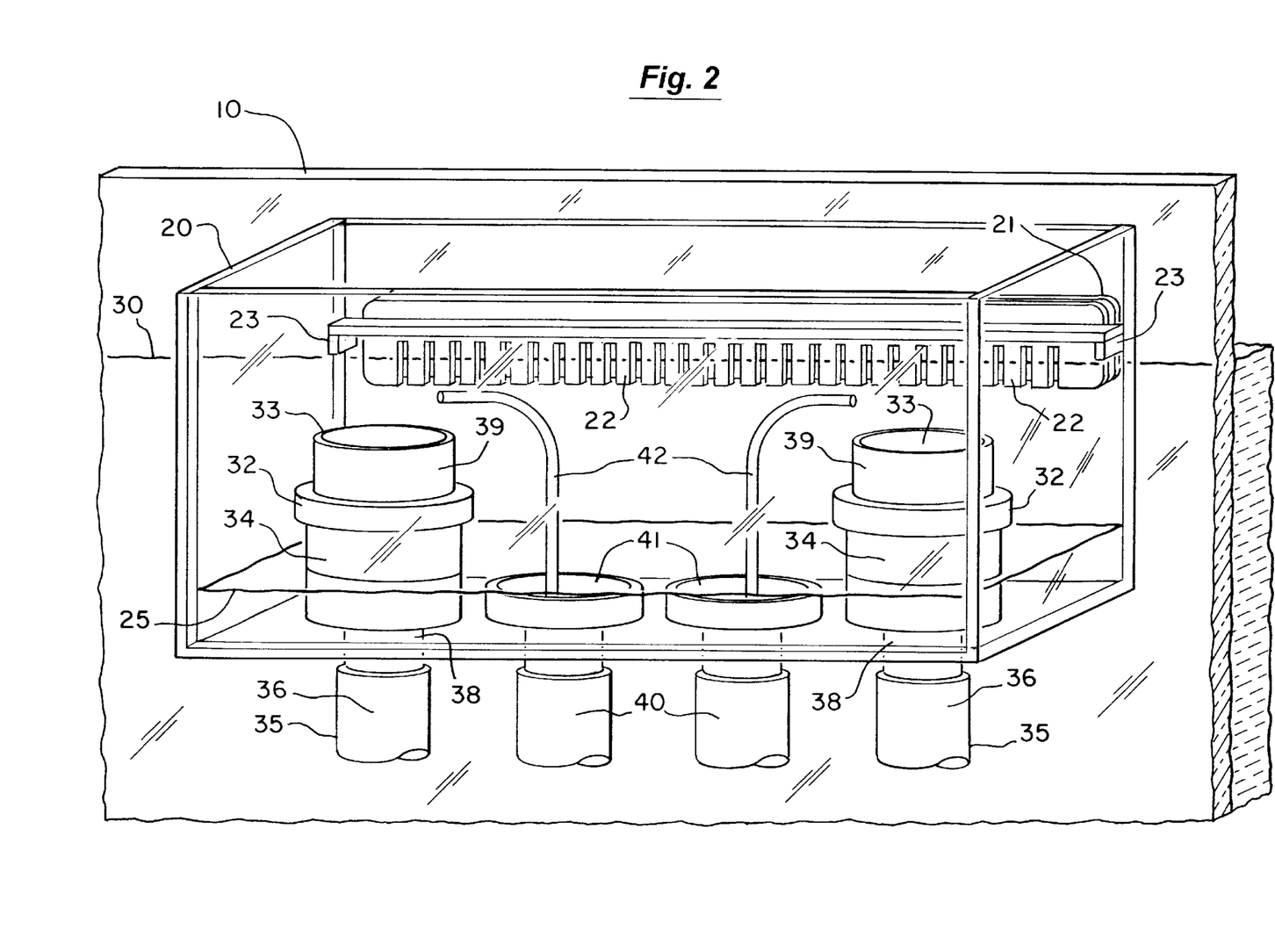
FIG. 2 is an enlarged rear perspective view of the external tank assembly corresponding to FIG. 1.

FIG. 2 provides an enlarged view of the external tank 20. To effectively remove surface contaminants, a horizontal opening 21 is created between the external tank 20 and the aquarium 10. This horizontal opening 21 is positioned at the surface water level of the aquarium such that in normal operating conditions approximately one half of the opening is below the surface water level of the aquarium 10. During normal operation the water level 25 created in the external tank 20 is slightly above the drain tube fittings 41. A plastic comb filter 22 is placed in the horizontal opening 21 to protect smaller specimens in the aquarium 10 from being drawn into the external tank 20. The plastic comb filter 22 is held in position by supports 23, attached to the sides of the external tank 20 proximate to the horizontal opening 21. The comb filter 22 is removable for easy cleaning and for situations where no comb filtration is desired.

As discussed above, for the health of the specimens it is important to remove subsurface contaminants from the water column. This is achieved in the present invention by the use of the subsurface tubes 35. The subsurface tubes 35 are connected to the lower portion of the back wall of the aquarium 10, proximate to the bottom of the aquarium 10, and with their other ends attached to the external tank 20. Alternatively, the subsurface tubes 35 may be connected directly to the bottom of the aquarium 10. However, subsurface tube 35 connections to the bottom of the aquarium 10 might interfere with the support stand, cabinet, table or other structure on which the aquarium 10 is placed.

Depending on the application of the aquarium 10, the subsurface tubes 35 may be connected beneath an undergravel filter, above the bottom gravel, or at some point within the bottom gravel. In the preferred embodiment of the present invention, the point of connection is at the surface of the gravel. This arrangement is preferred because as water flows over, under, or through a porous medium (such as aquarium gravel made from ground coral or rock), a bacterial colony will be formed. This is the traditional method of operation for an undergravel filter that draws all water through the gravel. By positioning the subsurface tube 35 inlets above the gravel, the present invention reduces the size of the bacterial colony within the bottom gravel, which is preferable when using other forms of primary filtration, such as algal filters, and further reduces the necessity of frequently cleaning the bottom gravel for removal of collected toxins. However, it is to be understood that precise placement of the inlets for the subsurface tubes 35, as well as the use of a bacterial filter, are matters of user preference and do not substantially affect the functioning of the present invention. Strainer caps 45 (shown in FIG. 5) of a type typically used in aquarium systems to prevent intake of small specimens are placed on each of the subsurface tube 35 intakes so as to protect small specimens from inadvertently being drawn into the filtering system.

The lower end of the subsurface tube 25 can be concealed beneath rock structures or bottom gravel so that it would be difficult to remove the subsurface tube for cleaning. The lower end of the subsurface tube 25 generally has a circular cross-section to simplify cleaning. A conventional flexible wire brush can be inserted through the upper end of the subsurface tube 25 and advanced downward along tube without significantly disturbing rocks or gravel adjacent to the lower end of the subsurface tube. Alternatively, the lower end of the subsurface tube 25 could be made in other shapes or configurations (e.g., for improved concealment).

As stated above, under normal operation the water level 25 within the external tank 20 is slightly above the drain tube fittings 41. Water flowing by hydraulic pressure out of the distal end 33 of subsurface tube 35 flows down the outside of the tube 35 and mixes with the surface water flowing in through the horizontal opening 21. The flow rate through the drain tubes 40 is self-regulating to match the flow rate of water returned from the reservoir 55 by the pump 60. If the water level 25 in the external tank 20 rises, the flow rate through the drain tubes 40 will increase. Such an increase in flow rate will drain the external tank 20 at an accelerated rate. The accelerated draining will cause the water level 25 in the external tank 20 to drop, and the system will self stabilize back to the normal operating water level 25 of slightly above the drain tube fittings 41.

Figure 3:
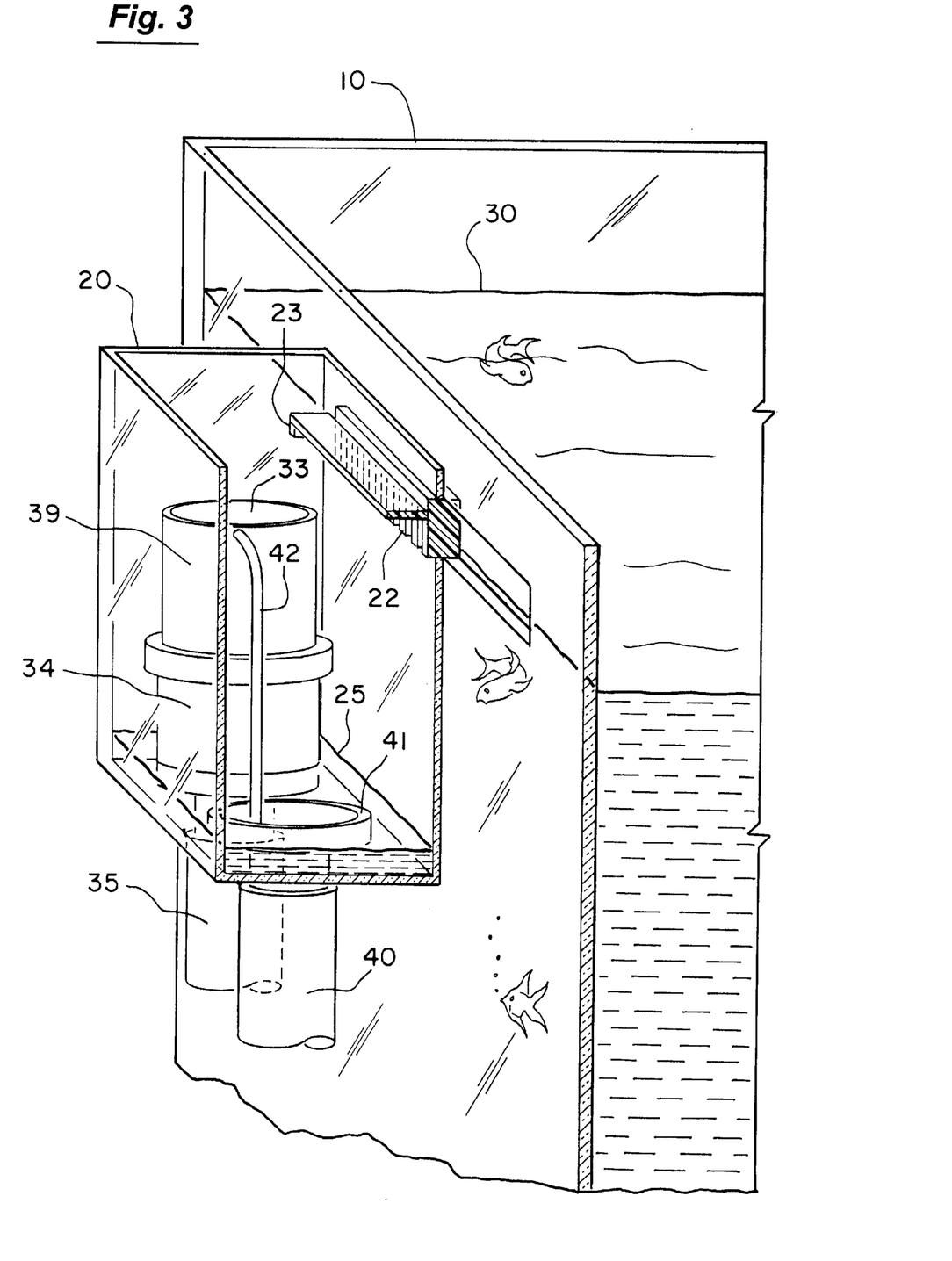
FIG. 3 is a perspective side view showing a portion of the external tank with the subsurface tube extended and a portion of the aquarium.
Figure 4:
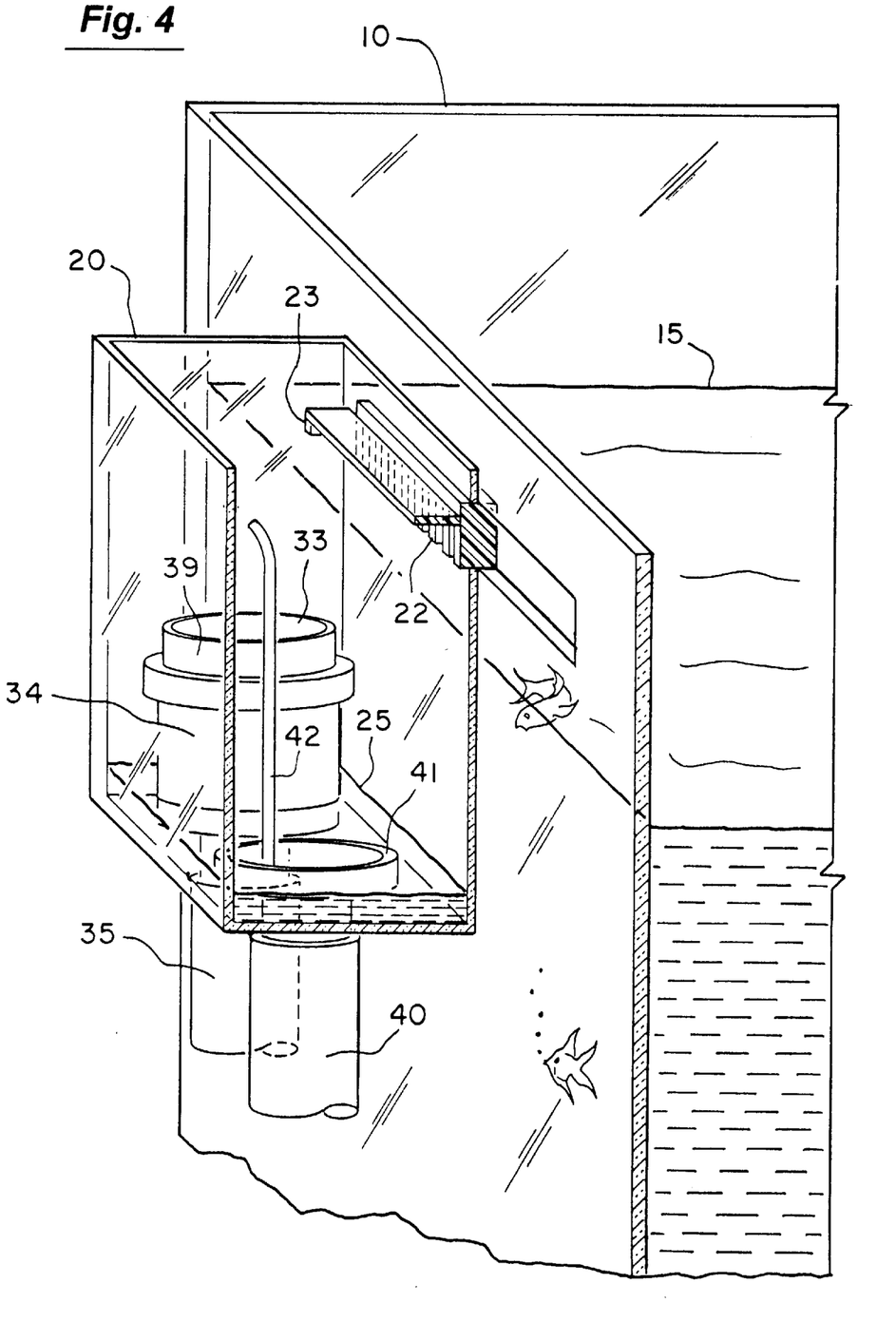
FIG. 4 is a perspective side view showing a portion of the external tank with the subsurface tube retracted and a portion of the aquarium.
Figure 5:
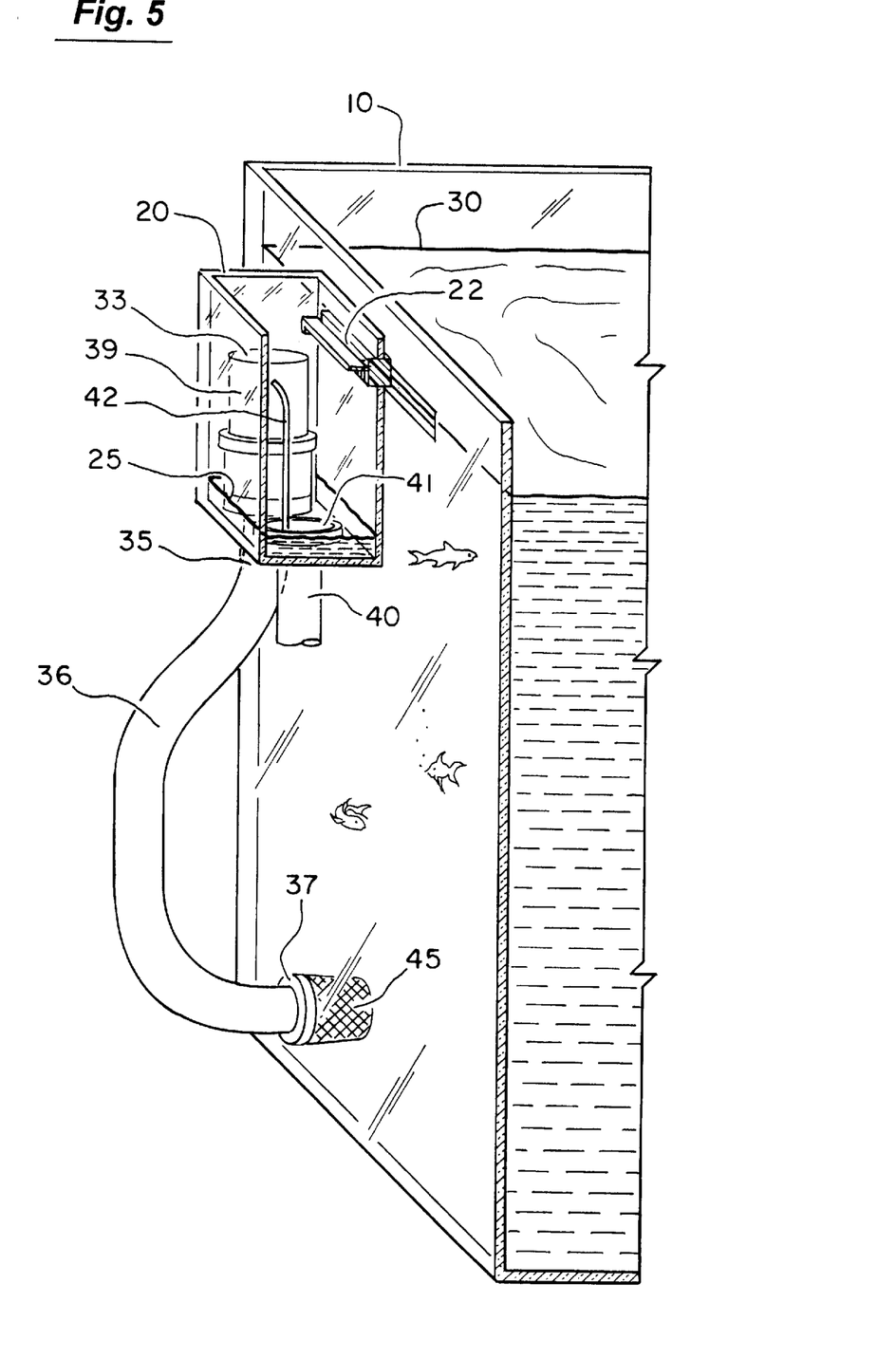
FIG. 5 is a perspective side view showing a portion of the external tank with the subsurface tube extended and a portion of the aquarium, corresponding to FIG. 3.
Figure 6:
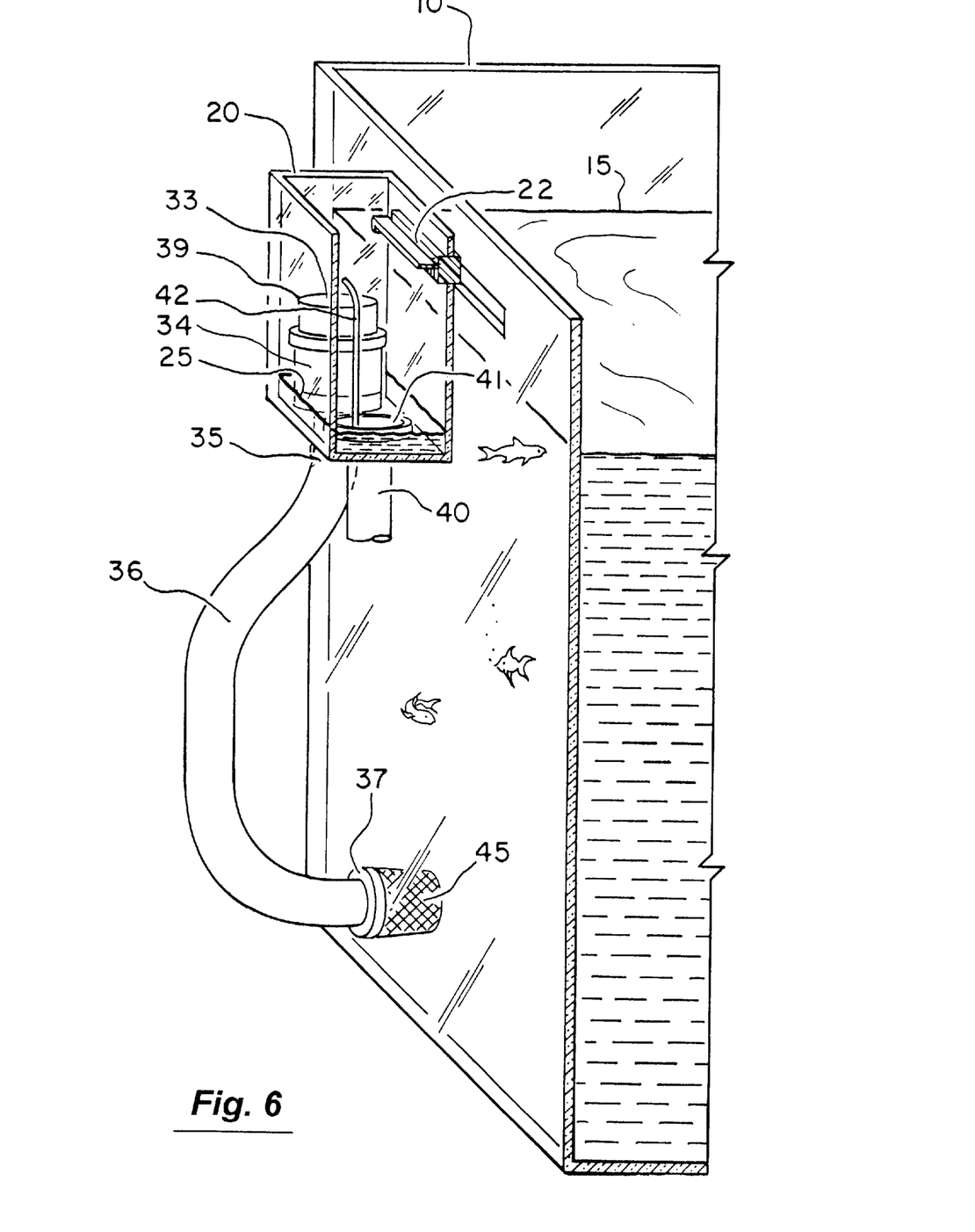
FIG. 6 is a perspective side view showing a portion of the external tank with the subsurface tube retracted and a portion of the aquarium, corresponding to FIG. 4.
Figure 7:
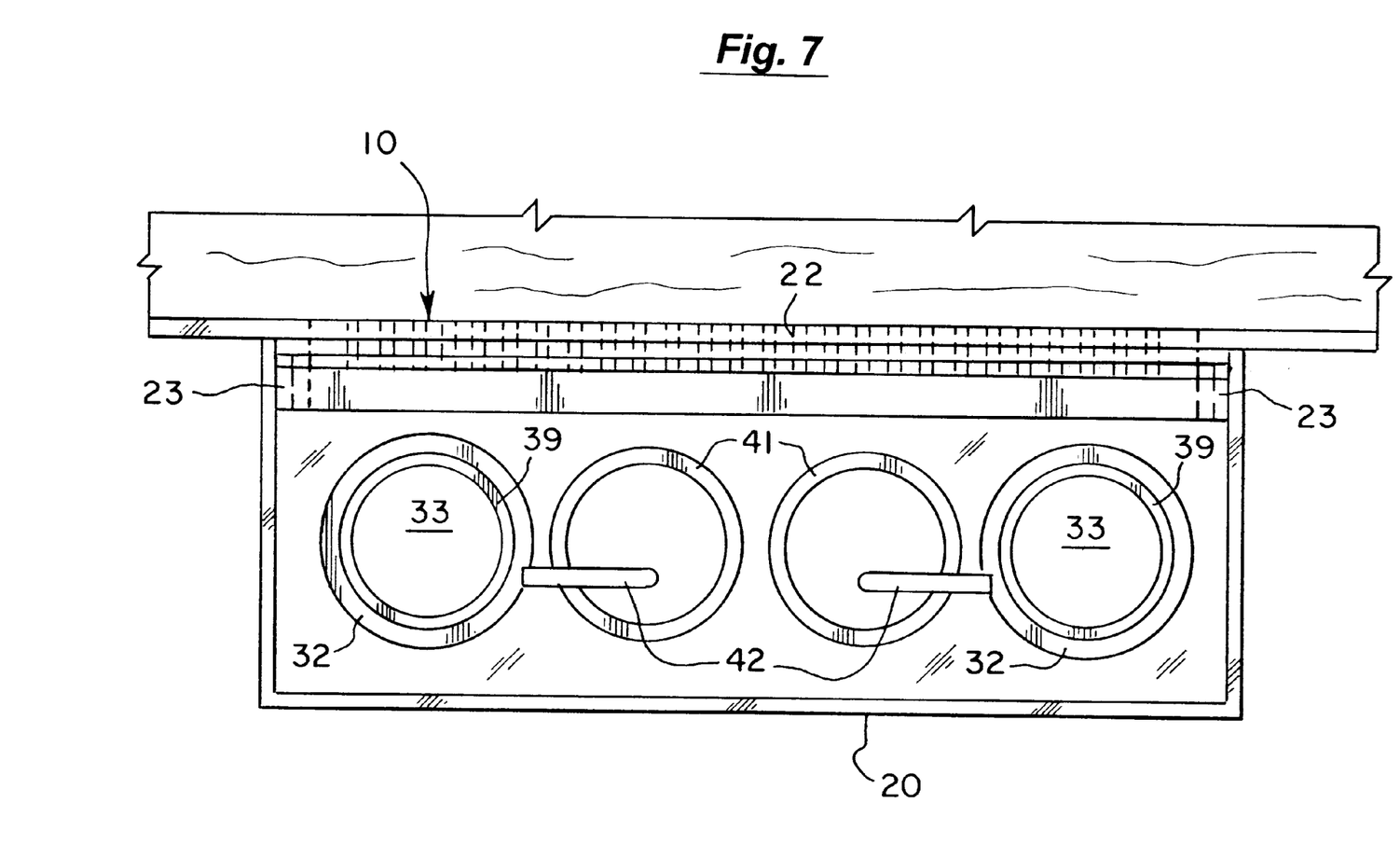
FIG. 7 is a top view of the external tank and a portion of the aquarium.

Within the external tank 20 the open distal ends 33 of the subsurface tubes 35 may be adjusted so as to raise or lower the height of the opening relative to the bottom of the external tank 20. FIGS. 3 and 5 depict the distal ends 33 of the subsurface tubes 35 extended within the external tank 20. FIGS. 4 and 6 depict the distal ends 33 of the subsurface tubes 35 retracted within the external tank 20. As depicted in FIGS. 1–7, the subsurface tubes 35 of the preferred embodiment are comprised of several component parts: a flexible hose 36, a PVC or equivalent type fitting 37 for securing a water-tight connection at the bottom portion of the side wall of aquarium 10, and a PVC or equivalent type fitting 38 for securing a water-tight connection with the external tank 20. This fitting 38 is equipped with a threaded distal end 34 protruding upwardly into the enclosed space of the external tank 20. A riser 39 slips down inside the distal end 34 and is held in place by a compression ring 32 attached by a married thread to the distal end 34 within the external tank 20. Height adjustment of the open distal end 33 of the subsurface tube 35 within the external tank 20 is achieved by loosening the compression ring 32 and then raising or lowering the riser 39. The riser 39 is then held in place at the chosen height by tightening the compression ring 32. The same adjustment could be achieved with the substitution of a threaded riser for depicted riser 39. Such a threaded riser would be attached by a married thread to the distal end 34 and height adjustment of the open distal end 33 would be achieved by rotation to screw or unscrew the threaded riser. This arrangement is not as preferable as the compression fitting arrangement, for without the use of Teflon tape or silicon grease (undesirable tank contaminants) within the threads, most currently available threaded fittings will allow seepage. In essence, the same adjustment could be achieved by use of a friction slip fitting and riser (or any other means of variably lengthening and shortening a subsurface tube) without affecting the function of the present invention.

When fully raised the distal end 33 of the subsurface tube 35 will extend above the surface of the water level of the aquarium 10. When the distal end 33 is raised to this height, the hydraulic pressure from the aquarium 10 is removed and water will cease to flow from the distal end 33 of the subsurface tube 35. When fully lowered the distal end 33 of the subsurface tube 35 will not be flush with the bottom of the external tank 20; however, the hydraulic pressure of the subsurface tube 35 will be such that the flow of water from the surface of the aquarium 10 will be comparatively small. In some situations it may be desirable to drop the surface water level 30 of the aquarium 10 so that it is below the horizontal opening 21. FIGS. 4 and 6 show a surface water level 15 that has been lowered below the horizontal opening.

The drain tubes 40 are connected to the bottom of the external tank 20 by means of PVC or other similar fittings 41 to achieve a watertight seal. The drain tubes 40 are then routed to the external filter 50. The flow rate through the drain tubes 40 may be sufficient in certain configurations to achieve a whirlpool effect, drawing surface air down into the drain tubes 40. Such an occurrence creates an audible suction sound that is not desirable. To prevent such an occurrence, in the preferred embodiment each drain tube 40 connection in the external tank 20 is fitted with a venturi vent tube 42. The venturi vent tubes 42 extend from within the drain tube 40 connection to a point above the surface water line in the external tank and allow air to be drawn into the drain tube 40. Because the venturi vent tubes 42 have a small diameter, the frequency of sound created by air passage through the venturi vent tubes 42 is above the human hearing spectrum and therefore not obtrusive to the enjoyable environment created by the presence of the aquarium 10.

Output from the external filter unit 50 flows to the reservoir 55. Output from the reservoir 55 is returned to the aquarium 10 at a constant rate by means of a pump 60. Virtually any type of commercially available pump can be used for this purpose. For example, the small inexpensive pumps that are conventionally used to circulate water through aquarium filters are satisfactory. It should be noted that in the present invention the flow rate of the entire system is self regulating, i.e., the rate at which water is drawn from the external tank 20 will equal the rate at which water is returned to the aquarium 10 by the pump 60.

In the event of a power failure, the water return by the pump 60 from the reservoir 55 will stop. Water from the aquarium 10 will then drain into the external tank 20 until the water level 30 in the aquarium 10 is equal to the height of the open distal ends 33 of the subsurface tubes 35 within the external tank 20, or equal to the bottom of the horizontal opening 21, whichever is lower. In either case, the distance between the surface waterline 30 and the bottom of the horizontal opening 21 or open distal ends 33 of the subsurface tubes 35 (whichever is lower) is very small relative to the overall vertical height of the aquarium 10. However, depending on the size of the aquarium 10, a few cups to several gallons of water may be drained before the flow is disrupted. The size and capacity of the reservoir 55 that is utilized within the system is therefore dependent upon the size of the aquarium 10.

Figure 8:
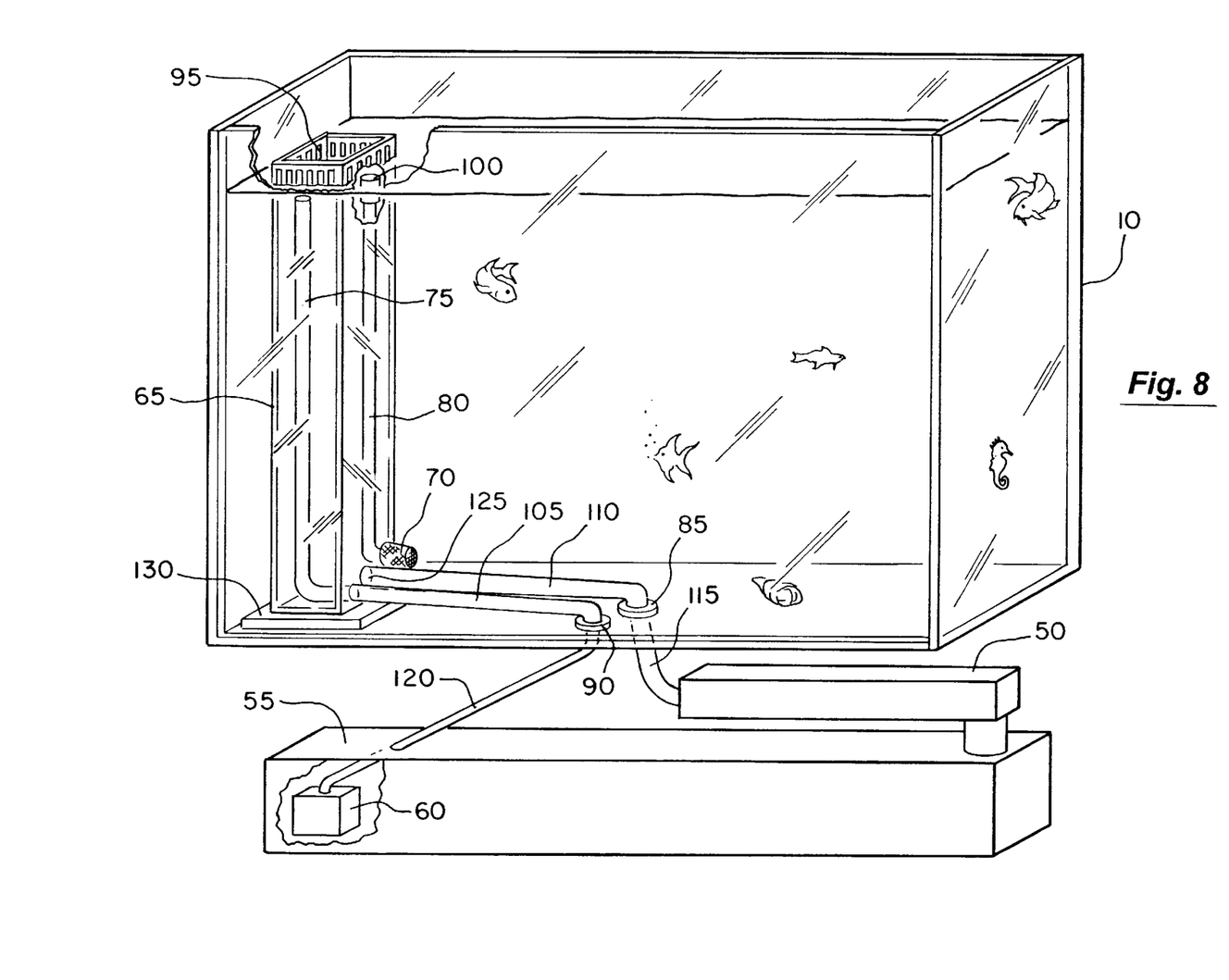
FIG. 8 is a front perspective view of an alternative embodiment of the invention configured for use with a bottom-drilled aquarium.

FIG. 8 is a front perspective view of an alternative embodiment of the invention that uses a tower-shaped tank 65 located within the aquarium 10, instead of an external tank. In this embodiment, the aquarium 10 is also equipped with two openings in its bottom wall with bulkhead fittings 85, 90 that permit tubes carrying water to and from the aquarium to pass through the bottom of the aquarium 10.

As before, water is drawn into the tank 65 from the aquarium 10 by hydrostatic pressure through a subsurface tube 80. The lower end of the subsurface tube 80 is covered by an extraction guard 70 (e.g., a screen or wire mesh) to prevent small aquatic specimens from being drawn into the tank 65. Surface water also flows from the aquarium 10 into the tank 65 through the horizontal openings in the comb filters 95, as before. The upper end of the subsurface tube 80 is located slightly below the water level in the aquarium, and includes an adjustable collar 100 for controlling the relative flow rates from the top and bottom of the aquarium, as previously discussed.

Water drains from the tank 65 through an outflow port 125 connected to flexible drain tubes 110, 115 leading to the filter 50. The water then flows from the filter 50 into the reservoir 55. A pump 60 returns the water to the aquarium 10 through a series of flexible tube segments 120, 105, 75.

The tank 65 is mounted on a base 130 resting on the bottom of the aquarium 10. The base 130, bulkhead fittings 85 and 90, and tubes 105 and 110 can be largely concealed by gravel and plants at the bottom of the aquarium 10 for aesthetic purposes. The tank 65 can be repositioned as desired within the aquarium since it is not necessary to attach the tank 65 to the aquarium 10. The height of the tank 65 can also be increased or decreased as desired to allow the aquarium 10 to be used for many purposes, such as a fish-only systems or fish-reptile combination systems, without the need to replace the aquarium 10 itself.

The above disclosure sets forth a number of embodiments of the present invention. Other arrangements or embodiments, not precisely set forth, could be practiced under the teachings of the present invention, and the scope of this invention is not limited by the above disclosure.

I claim:

1. An apparatus for drawing water from an aquarium for delivery to a filter, said aquarium containing water with an upper surface, said apparatus comprising:

a tank;

an opening between said tank and the aquarium adjacent to the water surface allowing water to flow from the aquarium into said tank;

a subsurface tube having:
   (a) a lower opening substantially below the water surface in the aquarium; and
   (b) an upper opening within said tank at an elevation below the water surface in the aquarium; and a drain tube allowing water to flow from said tank into the filter.

2. The apparatus of claim 1 wherein said subsurface tube further comprises means for adjusting the elevation of said upper opening of said subsurface tube.

3. The apparatus of claim 1 wherein said tank is external to the aquarium.

4. The apparatus of claim 1 wherein said tank is within the aquarium.

5. The apparatus of claim 1 wherein said opening comprises an elongated horizontal opening extending along the water surface.

6. The apparatus of claim 1 wherein said opening further comprises a comb filter.

7. The apparatus of claim 1 further comprising a venturi vent tube extending from within said drain tube to point above the water level in said tank to allow air to be drawn into said drain tube.

8. The apparatus of claim 1 wherein said lower opening of said subsurface tube further comprises an extraction guard.

9. An apparatus for filtering water from an aquarium, said aquarium containing water with an upper surface, said apparatus comprising:

a tank;

an opening between said tank and the aquarium adjacent to the water surface allowing water to flow from the aquarium into said tank;

a subsurface tube having:
- (a) a lower opening substantially below the water surface in the aquarium; and
- (b) an upper opening within said tank at an elevation below the water surface in the aquarium;

a filter;

drain means for allowing water to flow from said tank into said filter; and pump means for returning water from said filter to the aquarium.

10. The apparatus of claim 9 wherein said subsurface tube further comprises means for adjusting the elevation of said upper opening of said subsurface tube.

11. The apparatus of claim 9 wherein said tank is external to the aquarium.

12. The apparatus of claim 9 wherein said tank is within the aquarium.

13. The apparatus of claim 9 wherein said filter comprises an algal filter.

14. The apparatus of claim 9 wherein said filter comprises a bacterial filter.

15. The apparatus of claim 9 wherein said opening comprises an elongated horizontal opening extending along the water surface.

16. The apparatus of claim 9 wherein said opening further comprises a comb filter.

17. The apparatus of claim 9 further comprising a venturi vent tube extending from within said drain tube to point above the water level in said tank to allow air to be drawn into said drain tube.

18. The apparatus of claim 9 further comprising a reservoir for holding water draining from said tank and the aquarium in the event said pump means fails.

19. An apparatus for filtering water from an aquarium, said aquarium containing water with an upper surface, said apparatus comprising:

a tank;

an opening between said tank and the aquarium adjacent to the water surface allowing water to flow from the aquarium into said tank;

a subsurface tube having:
- (a) a lower opening substantially below the water surface in the aquarium; and
- (b) an upper opening within said tank at an elevation below the water surface in the aquarium;

a filter below said tank;

drain means for allowing water to flow from said tank into said filter;

a reservoir below said filter holding water draining from said filter; and pump means for returning water from said reservoir to the aquarium;

wherein said reservoir has sufficient capacity to hold all of the water contained in said filter, said tank, and the portion of the aquarium above said opening to said tank in the event said pump means fails.

20. The apparatus of claim 19 wherein said subsurface tube further comprises means for adjusting the elevation of said upper opening of said subsurface tube.

21. The apparatus of claim 19 wherein said opening comprises an elongated horizontal opening extending along the water surface.

* * * * *